A. E. PETERSON.
CORN PLANTER.
APPLICATION FILED MAR. 23, 1908.
901,257.
Patented Oct. 13, 1908.
2 SHEETS—SHEET 1.
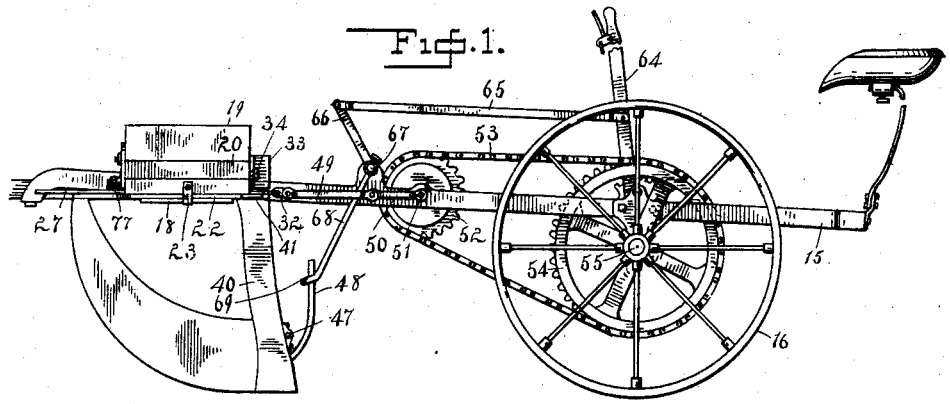
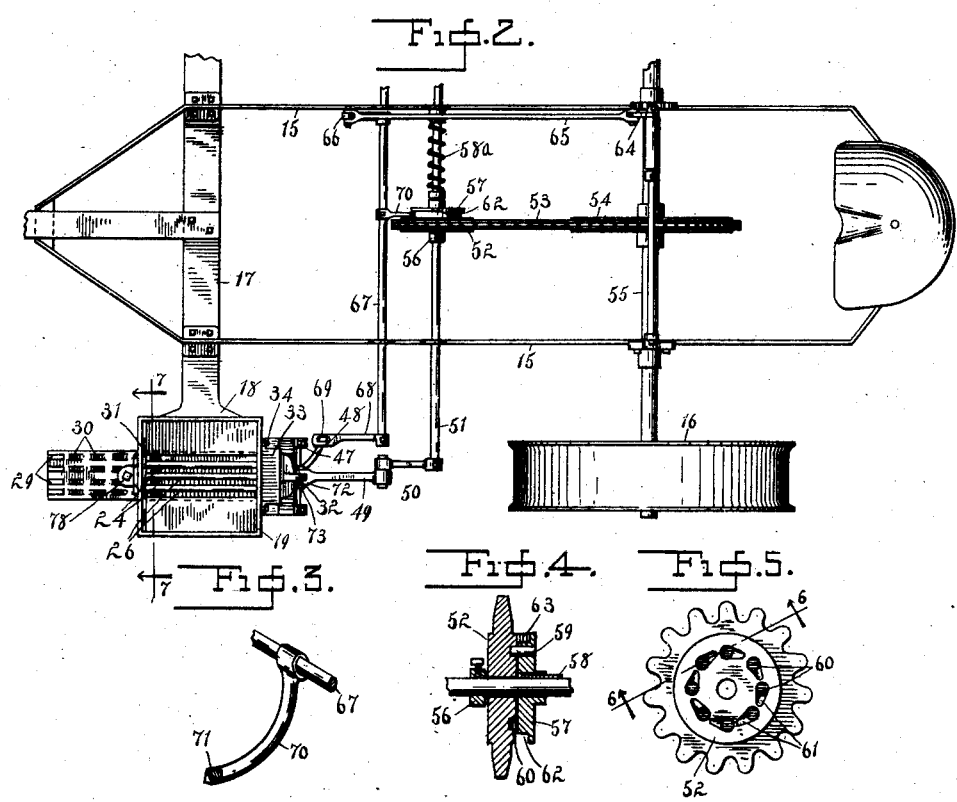
WITNESSES:
Mathew J. Marty
M. A. Milord
INVENTOR
August E. Peterson
By Frederick Benjamin
ATTY.

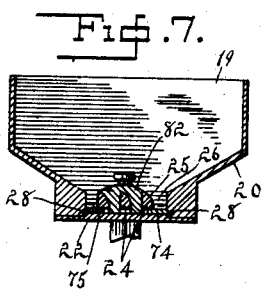

UNITED STATES PATENT OFFICE.

AUGUST E. PETERSON, OF MOLINE, ILLINOIS.

CORN-PLANTER.

No. 901,257.   Specification of Letters Patent.   Patented Oct. 13, 1908.

Application filed March 23, 1908. Serial No. 422,597.

*To all whom it may concern:*

Be it known that I, AUGUST E. PETERSON, citizen of the United States, residing at the city of Moline, in the county of Rock Island and State of Illinois, have invented certain new and useful Improvements in Corn-Planters, of which the following is a specification.

My invention relates to agricultural implements and refers particularly to corn planters.

The chief objects of the improvements which form the subject matter of this application are to provide a feeding device so arranged as to produce uniform seeding; to furnish a mechanism that can be adapted, by the substitution of some of the operating parts, for dropping the corn in hills, as in ordinary check-row planting, or depositing the seeds at spaced intervals required in drilling; and to supply a novel and efficient method of automatically controlling the movement of the seed selecting mechanism, as when turning at the end of the rows, or when transporting the machine from field to field, the required result being accomplished by a clutch wheel of special construction, and a coöperating shifting pawl attached to the mechanism which operates the chute or second drop valve.

Other objects of this invention are to furnish means for regulating the amount of seed fed to the selecting plates; to supply yielding elements for clearing the seed selecting plates to avoid clogging and to provide a selecting plate, formed of coacting parts, and furnished with a positive alternate reciprocating movement.

Further objects are to furnish a hopper or seed box having a plurality of slots in the bottom plate, in order to produce a uniformity in the supply of seed to all parts of the selecting slides, to insure accurate and uniform seeding so long as any material quantity of seed remains in the hopper and to facilitate the partial shutting off of the feed supply, which is necessary when the drilling plates are used.

I accomplish the above and other important objects by the employment of the mechanism illustrated in the accompanying drawings forming a part of this application, and in which:—

Figure 1 is a side elevation of a corn planter provided with my improved seeding devices; Fig. 2 is a top plan view, the mechanism upon one side only being shown; Fig. 3 is a perspective view of the clutch operating lever; Fig. 4 is a sectional view of the clutch; Fig. 5 is a side elevation of the sprocketed element of the clutch; Fig. 6 is a sectional view on the line 6—6 of Fig. 5; Fig. 7 is a section on the line 7—7 of Fig. 2; Fig. 8 is a side elevation of the furrow shoe and feed box, the latter being opened upon its hinges to disclose the formation of the bottom plate which is thus seen as in a bottom plan view; Fig. 9 is a top plan view of the feed box portions being broken away to disclose the application of a modified form of the selecting device; Fig. 10 is a longitudinal section of the feed box, Fig. 11 is a perspective view of the channel and stop plate. Fig. 12 is a fragmentary view of the rear portion of one of the bed plates with the feed hopper removed, and Figs. 13 and 14 are face and edge views, respectively, of the clutch disk.

Referring to the details of the drawings the reference numeral 15 indicates the main frame of a corn planter, supported upon furrow covering wheels 16. Attached to said frame near the front of the machine is a cross member consisting of a plate 17 having its ends widened to form plates 18 upon which the feed boxes 19 are supported. I prefer to construct these boxes in a rectangular form, their lower portions having sloping sides 20, in hopper form, to direct the seed corn toward the bottom of the hopper. The seed boxes 19 are hinged at 21 to a base or bed plate 22 which extends front and rear beyond said box, and said box is provided with a latch or catch 23 to lock it in operative position. The bottom of the box or hopper is composed of longitudinal strips 24 having one upper corner chamfered or rounded as at 25, and spaced apart to leave intervals in the form of slots or channels 26 through which the seed falls by gravity upon the feed or seed-selecting plate 27. This plate is arranged between the bottom of the box and the base, or bed plate 22, and has its edges chamfered to have a sliding fit in grooves 28 formed in the box sides. The slide plate is furnished upon its upper surface with longitudinal ridges 29, which are cut away at spaced intervals for the greater portion of their length, thus leaving corrugations in the form of teeth 30, projecting into the slots or channels 26. In line with the teeth and about equi-distant from the slide ends are located the feed, or seed selecting apertures 31, arranged in a transverse row, corresponding in number and registering with the slots 26. The rear end of the slide is supplied with a lug 32, to which an operating member, hereinafter described is attached. To the rear end of the feed box an extension or housing 33 is attached by screws or bolts 34, and subdivided by partitions 35 which aline with the bars 24. Between these partitions are located fingers 36, mounted to turn upon a fixed shaft 37. The ends of said fingers are yieldingly held against the upper surface of the slide plate, by springs 38, which are fixed at their lower ends to the fingers 36, their upper ends engaging the rear wall of the housing 33 and thus permit the fingers to ride over the teeth 30 with which they aline and preventing any grains of corn from being carried past this point by said teeth, the fingers thus serving to guard the housing from the entrance of any of the seed except what lies in the feed apertures 31. The under side of the housing 33 is open and the plate 22 beneath is furnished with an opening 39 through which the corn drops into a chute 40. Between the plate 22 and the housing is located a transverse slide 41 secured to the plate by a screw 42, which engages a slot 43. The slide has an aperture 44, co-extensive with the opening 39, thus offering no obstruction to the corn as it falls from the feed plate, when the slide is in its initial position, as shown in Fig. 12. When the slide is extended, however, as shown in dotted outlines, in said figure, the blank portion 45 of the slide will be interposed beneath one or more of the feed apertures so as to prevent the seed from falling therefrom. The chute 40 is provided with the usual valve 46, hinged at 47, and furnished with an operating arm 48, for connection with the seed dropping controlling mechanism hereinafter disclosed.

The feed plate 27 is reciprocated by a pitman rod 49, attached to a crank 50 mounted on a shaft 51 journaled in the main frame 15. The shaft carries a loose sprocket wheel 52, connected by a chain 53 to a sprocket 54 fixed on the axle 55 of the ground wheels 16. The sprocket 52 is retained in position upon the shaft on one side by a collar 56, and on the other by a clutch disk 57, which is slidably mounted upon the shaft and caused to turn therewith by a feather 58. The said disk is normally held in opposition with the sprocket 52 by a spiral spring 58ª which surrounds the shaft. The side of the disk contiguous to the sprocket is furnished with a pin 59, adapted to engage spaced holes 60 concentrically arranged upon the adjacent side face of the said sprocket 52. To facilitate the engagement of said pin 59 therewith the margins of the holes are cut away upon one side to form inclined channels or leads 61, shown in Figs. 5 and 6. The peripheral face of the disk is rabbeted upon the edge adjacent to the sprocket and this rabbet forms a channel or groove 62 when the disk and sprocket are in opposition. Within the groove or rabbet 62 is a projection or lug 63 located radially with the pin 59 and having upon one side an inclined face 63ª, which serves as a cam in a manner to be described. The valve 46 is operated by a ratchet-lever 64 connected by a link bar 65 to an arm 66 attached to a rock-shaft 67 supported on the frame 15, and having a second arm 68 extending downward and terminating in an eye 69 through which the valve operating arm 48 passes, forming a loose connection or joint. Upon said rock-shaft 67, and in alinement with the groove 62 is attached a clutch operating finger 70, the free end of which is beveled or chamfered to form an incline 71. When the valve 46 is closed by the operation of the lever 64, the end of the clutch finger 70 will move toward the clutch and engage the groove 62, forming an abutment against which the lug 63 will impinge as the disk turns the inclined faces 63ª and 71 causing a separation of the clutch members 52 and 57 to a sufficient extent to release the pin 59 and thus stop the movement of the shaft 51. An opposite movement of the lever 64 will, of course, remove the finger 70 from its operative position simultaneously with the opening of the valve 46, and the spring 58ª will force the clutch disk against the sprocket causing an engagement therewith of the pin 59.

The end of the pitman 49 attached to the plate 27 is provided with a fork 72, secured to the lug 32 of the said plate by a removable pin 73, so that the plate may be changed when the style of planting is to be varied.

In Fig. 9 is shown a modified form of selecting mechanism to be used when it is desired to drill the corn instead of dropping it in groups at spaced intervals as by the plate 27 hereinbefore described. The drilling plate is composed of two coacting members 74, 75, arranged side by side, their combined widths equaling that of the plate 27, and having their outside margins only chamfered to fit the grooves 28 in which they slide. The member 74 has an attaching lug 32, its front portion being narrowed and furnished upon its inner edge with rack teeth 76. The companion strap 75 also has rack teeth corresponding with those upon the strip 74, and both racks mesh with a pinion 77 placed between the slides or strips. This pinion is mounted upon a block 78 which slides vertically in ways 79 fixed to the front of the box 19. A set bolt 80 passing through a slot 81 in the block 78, serves to lock the pinion in adjusted position. When the plate 27 is in use the pinion is raised to its inoperative position as shown in Fig. 10, to permit the said plate to slide freely beneath, being dropped to its lower position when the slides 74 and 75 are employed. Each of these slides has a single row of corrugations or teeth 30 and seed apertures 31, the latter being preferably three in number and arranged longitudinally instead of transverse as in the case of the single slide. Since the two inside slots or channels 26 are not used a stop plate 82 is provided for closing these channels when the drilling plates are in position. The plate 75 has no connections with its companion or the pitman but reciprocates in a direction opposite that of the pitman operated slide, being driven, as will be readily understood, by the pinion 77. By inspection of Fig. 9, it will be seen that only one of the feed apertures 31 registers with the openings in the slide 41 and plate 22 at any time and the proportions and adjustments are such that the said apertures will be in dropping position at regular periods so that single kernels of corn will be deposited at spaced intervals.

Since the functions of the various mechanisms have been fully set forth in the detailed description of the various parts a general outline only of the method of operating the devices will be here given.

To plant corn in hills the slide plate 27 is assembled within the slide way beneath the feed box 19, the pinion 77 having first been raised to its inoperative position. The pitman rod 49 is then attached by the pin 73 and the finger 70 brought into contact with the bottom of the groove 62, the same act closing the valve 46. When ready to plant the clutch is released, the valve 46 opened and the forward movement of the planter will cause the feed plate to reciprocate. The said plate is arranged to drop four seeds in a hill, and to diminish that number it is only necessary to adjust the slide 41. When turning at the end of the journey across the field, the valve 46 is closed and the clutch released, until the machine has been carried to the point where the planting is to be renewed.

Having thus described my invention what I claim as new is:—

1. In a seed-planter, the combination of a seed box, a slotted bottom therefor, a seed plate having apertures, a series of projections on said plate arranged in alinement with said apertures, and yielding fingers normally in engagement with said plate.

2. In a seed-planter, the combination of a seed box, a slotted bottom therefor, a seed plate having apertures therein, a series of projections on said plate arranged in alinement with said apertures, yielding fingers normally in engagement with said plate and arranged in alinement with said projections, and a stop-plate removably arranged within the seed box.

3. In a seed planter, the combination of a seed box, a slotted bottom therefor, a seed plate having apertures therein, a series of projections on said plate arranged in alinement with said apertures, yielding fingers normally in engagement with said plate and arranged in alinement with said projections a stop-plate removably arranged within the seed box, and a feed regulating slide arranged beneath the seed plate.

4. In a seed planter, the combination of a seed box, a slotted bottom therefor, a seed plate having apertures therein, a series of projections on said plate arranged in alinement with said apertures, yielding fingers normally in engagement with said plate and arranged in alinement with said projections, a stop-plate adapted to cover a portion of the slotted bottom, a feed regulating slide beneath the seed plate, and means for operating said slide.

5. In a seed planter, the combination with a main frame, and an axle, of a seed chute, a valve in said chute, a counter-shaft connected with the axle, a rock-shaft, means connected with said rock-shaft for operating said valve, and means for stopping the movement of said counter-shaft when the rock-shaft is operated to close said valve.

6. In a seed planter, the combination with a main frame, and an axle, of a seed chute, a valve in said chute, a counter-shaft connected with the axle, a rock-shaft, means on said rock-shaft for operating the valve, an arm mounted on the rock-shaft and adapted to throw the said counter-shaft out of gear when said rock shaft is operated in one direction, and means for automatically putting the counter-shaft into gear when the rock shaft is operated in the opposite direction.

7. In a seed planter, the combination with an axle, a seeding device, a chute therefor, a valve in the chute, a counter-shaft connected with said axle, a rock-shaft and operative connection between said rock-shaft and the valve, of means for stopping the movement of said counter-shaft when the rock-shaft is operated, said stopping means comprising a gear wheel on the counter shaft connected with the said axle, a clutch adapted to engage said wheel, a spring for the clutch, and an arm on said rock-shaft, adapted to operate said clutch.

8. In a seed planter, the combination with an axle, seeding mechanism, a chute therefor, a valve in the chute, a counter-shaft connected with said axle, a rock-shaft, and operative connection between the rock-shaft and said valve, of means for throwing the counter-shaft out of gear with the axle, said means comprising a gear-wheel loose on the counter-shaft, a disk slidably mounted on said counter-shaft, means on said disk for operatively engaging said gear-wheel, a spring for the disk, and means connected with said rock-shaft for sliding said disk.

9. In a seed planter, the combination with the main frame an axle, seeding mechanism, a seed chute, a valve in the chute, a counter-shaft connected with the axle, a rock-shaft, means connected with said rock-shaft for operating said valve, a gear wheel loosely mounted upon said counter-shaft, a clutch adapted to connect said gear wheel with the counter-shaft, and an arm attached to said rock-shaft and arranged to operate said clutch.

10. In a seed planter, the combination with seed boxes, chutes beneath the boxes, valves in the chutes, and a counter-shaft, of a gear wheel on said shaft, a disk slidably mounted on said shaft, means on said disk for engaging said wheel, a spring tending to hold the disk and wheel in engagement, a rock-shaft, an arm on said rock-shaft adapted to slide said disk out of engagement with said wheel, connection between the rock-shaft and said valve, and operating means for the rock-shaft.

In testimony whereof I affix my signature in the presence of two witnesses.

AUGUST E. PETERSON.

Witnesses:
 MANSFIELD M. STURGEON,
 JAMES F. MURPHY.